(12) United States Patent
Wei et al.

(10) Patent No.: US 11,271,403 B2
(45) Date of Patent: Mar. 8, 2022

(54) METHOD FOR OPERATING A WIND POWER FACILITY

(71) Applicant: VESTAS WIND SYSTEMS A/S, Aarhus N (DK)

(72) Inventors: Mu Wei, Solbjerg (DK); Torsten Lund, Fredericia (DK); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/753,965

(22) PCT Filed: Oct. 2, 2018

(86) PCT No.: PCT/DK2018/050244
§ 371 (c)(1),
(2) Date: Apr. 6, 2020

(87) PCT Pub. No.: WO2019/068297
PCT Pub. Date: Apr. 11, 2019

(65) Prior Publication Data
US 2020/0395760 A1 Dec. 17, 2020

(30) Foreign Application Priority Data
Oct. 6, 2017 (DK) .............................. PA201770759

(51) Int. Cl.
*H02J 3/38* (2006.01)
*F03D 7/02* (2006.01)
*H02J 3/18* (2006.01)

(52) U.S. Cl.
CPC .............. *H02J 3/381* (2013.01); *F03D 7/028* (2013.01); *H02J 3/18* (2013.01); *H02J 3/388* (2020.01); *H02J 2300/28* (2020.01)

(58) Field of Classification Search
CPC .... H02J 3/18; H02J 3/381; H02J 3/388; H02J 2300/28; F03D 7/028
(Continued)

(56) References Cited

U.S. PATENT DOCUMENTS

| 8,248,039 B2* | 8/2012 | Cao ........................ F03D 7/0272 |
| | | 322/37 |
| 9,551,323 B2* | 1/2017 | Garcia ..................... H02J 3/381 |

(Continued)

FOREIGN PATENT DOCUMENTS

| WO | 2013142553 A2 | 9/2013 |
| WO | 2015102598 A1 | 7/2015 |

(Continued)

OTHER PUBLICATIONS

PCT Written Opinion of the International Searching Authority for Application No. PCT/DK2018/050244 dated Mar. 22, 2018.

(Continued)

*Primary Examiner* — Pedro J Cuevas
(74) *Attorney, Agent, or Firm* — Patterson + Sheridan, LLP

(57) ABSTRACT

A method for preparing a wind power facility for a transition from a first mode of operation to a second mode of operation includes the steps of specifying a set of operational parameters to be applied by the wind power facility in connection with the second mode of operation, said specified set of operational parameters being available for the wind power facility in response to a provided transition triggering signal, and providing the transition triggering signal and applying the specified set of operational parameters in the wind power facility in response thereto, wherein a subset of the specified set of operational parameters is applied in each of a plurality of wind turbine generators in response to the provided transition triggering signal. The first mode of operation may (Continued)

involve a normal mode of operation whereas the second mode of operation may involve an island mode of operation.

10 Claims, 2 Drawing Sheets

(58) Field of Classification Search
USPC .............................. 290/44, 55; 700/280–299
See application file for complete search history.

(56) References Cited

U.S. PATENT DOCUMENTS

| | | | |
|---|---|---|---|
| 10,015,184 B1* | 7/2018 | Bell | H04L 63/1425 |
| 10,697,439 B2* | 6/2020 | Wheeler | G01M 15/14 |
| 2010/0327585 A1* | 12/2010 | Cao | H02P 21/12 |
| | | | 290/44 |
| 2012/0283888 A1 | 11/2012 | Mao et al. | |
| 2014/0277814 A1* | 9/2014 | Hall | H02J 3/24 |
| | | | 700/298 |
| 2015/0137520 A1 | 5/2015 | Garcia | |
| 2015/0211492 A1* | 7/2015 | Garcia | H02J 3/381 |
| | | | 290/44 |
| 2015/0249416 A1 | 9/2015 | Barker | |
| 2015/0337806 A1* | 11/2015 | Damgaard | F03D 1/00 |
| | | | 700/287 |
| 2018/0363632 A1* | 12/2018 | Wheeler | F03D 7/043 |
| 2020/0059178 A1* | 2/2020 | Brombach | H02M 1/32 |
| 2020/0259335 A1* | 8/2020 | Weidauer | H02J 13/0006 |
| 2021/0199090 A1* | 7/2021 | Wei | F03D 7/048 |
| 2021/0281078 A1* | 9/2021 | Desabhatla | H02J 3/241 |

FOREIGN PATENT DOCUMENTS

| | | |
|---|---|---|
| WO | 2016029944 A1 | 3/2016 |
| WO | 2016070906 A1 | 5/2016 |
| WO | 2016126263 A1 | 8/2016 |
| WO | 2017004125 A1 | 1/2017 |
| WO | 2017067585 A1 | 4/2017 |
| WO | 2019068297 A1 | 4/2019 |

OTHER PUBLICATIONS

Danish Search Report for Application PA 2017 70759 dated Mar. 22, 2018.
Kwok Cheung et al, "Generation dispatch in a smart grid environment", Innovative Smart Grid Technologies (ISGT), 2010, IEEE, Piscataway, NJ, USA, Jan. 19, 2010 (Jan. 19, 2010), pp. 1-6, XP031650385.
European Patent Office, Communication pursuant to Article 94(3) EPC for Application 18782884.3 dated Oct. 21, 2021.

* cited by examiner

METHOD FOR OPERATING A WIND POWER FACILITY

FIELD OF THE INVENTION

The present invention relates to a method for preparing a wind power facility for a transition from a first mode of operation to a second mode of operation. For example, the present invention may relate to a method for preparing a wind power facility for a transition from a normal mode of operation to an islanding mode of operation, or vice versa.

BACKGROUND OF THE INVENTION

It is well-established knowledge that it may be a rather time consuming process to bring a wind power facility form one mode of operation to another mode of operation.

WO 2017/004125 A1 teaches a power system having a plurality of power converters coupled together at a point of common coupling (PCC). The power converters are coupled to a load and provide a combined power converter output to the load. A switch is coupled in series between the PCC and an external grid. When the switch is closed, the power system is in a grid-tied configuration and when the switch is open, the power system is in a micro-grid configuration. A control system coupled to the power converters enables the switch to open and close in response to a signal received from one or more sensors monitoring the external grid, enables the power converters to operate in a current control mode when the switch is closed, and transitions the power converters from grid-tied mode to micro-grid mode and synchronize the power converters such that the converters share the load.

The arrangement suggested in WO 2017/004125 A1 is rather slow in that the roles of the plurality converters are not predefined before the transition from the grid-tied mode to the micro-grid mode is initiated.

It may be seen as an object of embodiments of the present invention to provide a method for ensuring a smooth and fast transition between a first mode of operation and a second mode of operation of a wind power facility.

DESCRIPTION OF THE INVENTION

The above mentioned object is complied with by providing, in a first aspect, a method for preparing a wind power facility for a transition from a first mode of operation to a second mode of operation, the wind power facility comprising a wind power plant comprising a plurality of wind turbine generators, the method comprising the steps of 1) specifying a set of operational parameters to be applied by the wind power facility in connection with the second mode of operation, said specified set of operational parameters being available for the wind power facility in response to a provided transition triggering signal, and
2) providing the transition triggering signal and applying the specified set of operational parameters in the wind power facility in response thereto wherein a subset of the specified set of operational parameters is applied in each of the wind turbine generators in response to the provided transition triggering signal.

Thus, the present invention addresses a method that brings a wind power facility from a first mode of operation to a second mode of operation in a smooth, safe and fast manner.

The smooth, safe and fast transition is advantageous and may be achieved by pre-informing the units of the wind power facility of their role during the second mode of operation. By pre-informing the units of the wind power facility of their role the transition to the second mode of operation becomes fast as only a transition trigger signal is required. According to the present invention the transition from the first mode of operation to the second mode of operation may follow a predetermined plan which has been laid down before the transition triggering signal is received. The units of the wind power facility may be wind turbine generators, energy storage device, energy dissipating devices, synchronous generators, STATCOMs etc.

In an embodiment of the invention the first mode of operation may involve a normal mode of operation of the wind power facility, and the second mode of operation may involve an island mode of operation of the wind power facility.

In another embodiment of the invention the first mode of operation may involve an island mode of operation of the wind power facility, and the second mode of operation may involve a normal mode of operation of the wind power facility.

The term wind power facility should be interpreted broadly and it may thus comprise a wind power plant (WPP) comprising a plurality of wind turbine generators (WTGs).

The subset of the specified set of operational parameters may be the same for all WTGs in the WPP. Alternatively, subsets of the specified set of operational parameters may be tailored to each of the WTGs of the WPP according to specific demands. Such demands may involve the positioning of the WTGs within the WPP.

In general, subsets of the specified set of operational parameters may relate to modes of operation, such as frequency control modes, voltage control modes, active power control modes, reactive power control modes, frequency set-points, voltage set-points, ramp rates etc.

In the island mode of operation, the wind power facility may be connected and thus supply power to consumers, such as local consumers in the vicinity of the wind power facility. In addition or in combination therewith, the wind power facility may be connected to other power generating units, such as other wind power facilities, solar power units and/or thermal production units.

The wind power facility may further comprise one or more auxiliary power modules, such as power dissipation modules, power storage modules, synchronous generators and/or STATCOMS. A subset of the specified set of operational parameters may be applied in each of the auxiliary power modules in response to the provided transition triggering signal.

In an embodiment of the invention the specified set of operational parameters may be associated with a frequency control mode of operation, such as a constant active power mode of operation, a droop mode of operation and/or a frequency master mode of operation. In another embodiment of the invention the specified set of operational parameters may be associated with a voltage control mode of operation, such as a constant reactive power mode of operation, a voltage droop mode of operation and/or an integral voltage control mode of operation. In yet another embodiment of the invention the specified set of operational parameters may comprise one or more operational set-points, such as active power set-points, reactive power set-points, voltage set-points and/or frequency set-points.

The specified set of operational parameters may further comprise one or more ramping rates adapted to ensure a smooth transition from the first mode of operation to the second mode of operation. The one or more ramping rates may prevent that transients, such as current transients, occur.

The transition triggering signal may in principle be provided or ordered by various people. The transition triggering signal may thus be provided by the operator of an associated power grid. The reason for providing the triggering signal may be various, such as a sudden change in the grid frequency and/or protective measures, such as a feedback signal from a protection relay.

In a second aspect, the present invention relates to a wind turbine facility comprising a wind power plant comprising a plurality of wind turbine generators, the wind power facility further comprising a wind power facility controller adapted to apply a specified set of operational parameters to the wind power facility in response to receiving a transition triggering signal, wherein a subset of the specified set of operational parameters is applied in each of the wind turbine generators in response to the provided transition triggering signal, the transition triggering signal triggering a transition from a first mode of operation to a second mode of operation of the wind power facility.

Similar to the first aspect the first mode of operation may involve a normal mode of operation of the wind power facility, and the second mode of operation may involve an island mode of operation of the wind power facility.

Similar to the first aspect the term wind power facility should be interpreted broadly and it may thus comprise a WPP comprising a plurality of WTGs.

The subset of the specified set of operational parameters may be the same for all WTGs in the WPP. Alternatively, subsets of the specified set of operational parameters may be tailored to each of the WTGs of the WPP according to specific demands. Such demands may involve the positioning of the WTGs within the WPP.

Again, subsets of the specified set of operational parameters may relate to modes of operation, such as frequency control modes, voltage control modes, active power control modes, reactive power control modes, frequency set-points, voltage set-points, ramp rates etc.

In addition to a plurality WTGs the wind power facility may further comprise one or more auxiliary power modules, such as power dissipation modules, power storage modules, synchronous generators and/or STATCOMS. A subset of the specified set of operational parameters may be applied in each of the auxiliary power modules in response to the provided transition triggering signal.

The transition triggering signal may in principle be provided or ordered by various people. The transition triggering signal may thus be provided by the operator of an associated power grid.

BRIEF DESCRIPTION OF THE DRAWINGS

The present invention will now be described in further details with reference to the accompanying figures, wherein.

Figure 1:
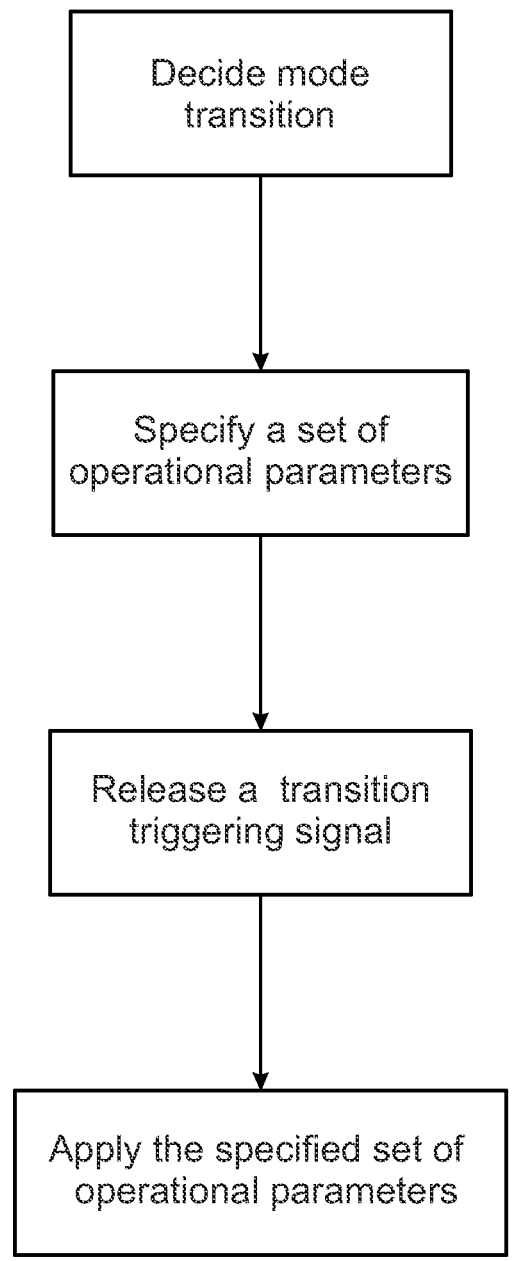
FIG. 1 shows a flow chart of the method according to the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a method for ensuring a smooth, safe and fast transition between a first mode of operation and a second mode of operation of a wind power facility. The wind power facility may involve a WPP having a plurality WTGs. The method of the present invention is in particular suitable for bringing a WPP from a normal mode of operation to an island mode of operation.

The method of the present invention provides that the WTGs of the WPP are pre-informed of their role during the second mode of operation. By pre-informing the WTGs the transition to the second mode of operation becomes fast as only a transition triggering signal is to be released to the WTGs of the WPP.

According to the present invention the transition from a first mode operation to a second mode of operation will follow a predetermined plan which has been laid down before the transition triggering signal is released. The predetermined plan also involves the role of optional auxiliary devices, such as energy storage devices, energy dissipating devices, synchronous generators, STATCOMs etc.

FIG. 1 shows a flow chart that illustrates the method of the present invention. Initially it is decided that a transition between a first mode of operation and a second mode of operation should occur. This decision may be made by for example the operator of the power distribution grid to which the wind power facility is connected during the first mode of operation.

When the decision has been made a set of operational parameters to be applied by the wind power facility after the transition is established. As previously addressed the method of the present invention finds its primary use in connection with transitions between a normal mode of operation and an island mode of operation of the wind power facility. Thus, the pre-defined set of operational parameters defines the role of the wind power facility during the island mode of operation.

Thus, according to the method of the present invention the role of the wind power facility during the island mode of operation is pre-defined by the set of operational parameters which is released and subsequently applied in the wind power facility in response to a release of the transition triggering signal, cf. FIG. 1.

As previously addressed the term wind power facility should be interpreted broadly and it may thus cover a WPP comprising a plurality of WTGs. In this scenario a subset of the specified set of operational parameters is applied in each of the WTGs in order to define the role of each WTG during the island mode of operation.

The subset of the specified set of operational parameters may be the same for all WTGs within the WPP. Alternatively, the subsets may be tailored to each of the WTGs in accordance with specific demands which may involve the positioning of the WTGs within the WPP.

In addition to a plurality WTGs the wind power facility may further comprise one or more auxiliary power modules, such as power dissipation modules, power storage modules, synchronous generators and/or STATCOMS. A subset of the specified set of operational parameters is applied in each of the auxiliary power modules upon release of the transition triggering signal.

Figure 2:
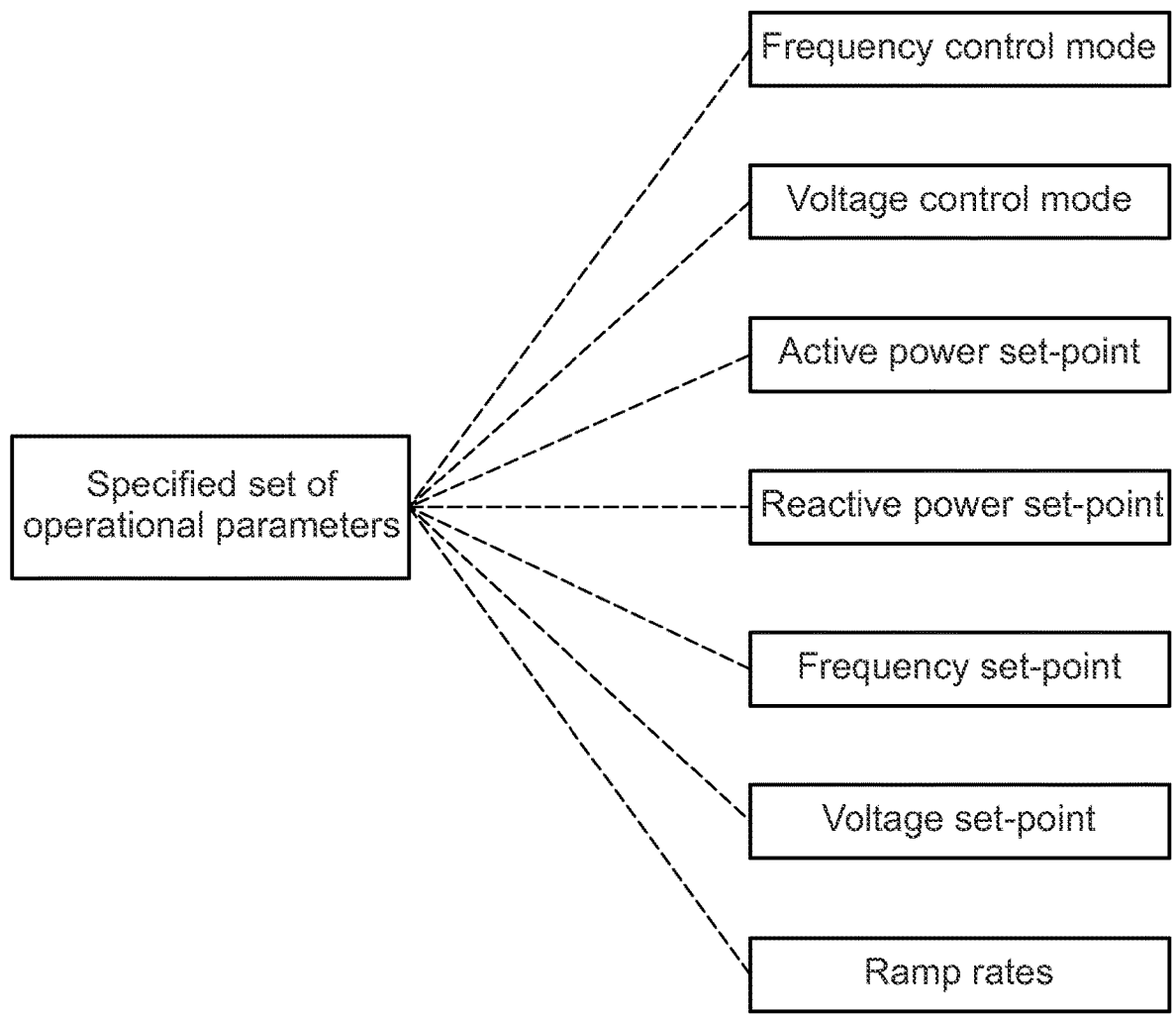
FIG. 2 shows examples of the specified set of operational parameters.

As illustrated in FIG. 2 the specified set of operational parameters, or subsets thereof, may comprise a variety of parameters according to which parameters the wind power facility is to be operated during the second mode of operation.

In an embodiment of the invention the specified set of operational parameters, or subsets thereof, define that the wind power facility should be operated in a frequency control mode during the second mode of operation. A frequency control mode of operation may be established via a constant active power mode of operation, a droop mode of operation and/or a frequency master mode of operation. As previously addressed the WTGs of the WPP may be operated in accordance with the same mode of operation, such as for example constant active power mode, or they may be operated in accordance with different modes of operations.

In another embodiment of the invention the specified set of operational parameters, or subsets thereof, define that the wind power facility should be operated in a voltage control mode during the second mode of operation. A voltage control mode of operation may be established via a constant reactive power mode of operation, a voltage droop mode of operation and/or an integral voltage control mode of operation. As previously addressed the WTGs of the WPP may be operated in accordance with the same mode of operation, such as for example constant reactive power mode, or they may be operated in accordance with different modes of operations.

The frequency control mode and the voltage control mode both aim at supporting a grid related parameter, namely a grid frequency or a grid voltage. Thus, the frequency control mode as well as the voltage control mode are both performed on a plant level.

In yet another embodiment of the invention the specified set of operational parameters, or subsets thereof, define one or more operational set-points, such as active power set-points, reactive power set-points, voltage set-points and/or frequency set-points. Control schemes according to one or more of these operational set-points are local control schemes performed on a number of WTGs of the WPP. Again, the WTGs of the WPP may be operated in accordance with the same operational set-point, or in accordance with different set-points.

Thus, some WTGs may be operated in accordance with for example active power set-points, whereas other WTGs may be operated in accordance with other operational set-points.

The specified set of operational parameters, or subsets thereof, may also define one or more ramping rates adapted to ensure a smooth transition from the first mode of operation to the second mode of operation. The one or more ramping rates thus prevents that transients, such as current transients, occur during transition.

The invention claimed is:

1. A method for preparing a wind power facility for a transition from a normal mode of operation to an island mode of operation, the wind power facility comprising a plurality of wind turbine generators, the method comprising:
   operating the plurality of wind turbine generators according to a first set of operational parameters for the normal mode of operation to provide power to an external power grid connected to the wind power facility;
   determining, based on a predetermined transition plan, a second set of operational parameters to be applied by the wind power facility in connection with the island mode of operation, wherein the second set of operational parameters are different from the first set of operational parameters to provide power to the wind power facility when the wind power facility is disconnected from the external power grid;
   while operating the plurality of wind turbine generators according to the first set of operational parameters, preloading the second set of operational parameters to the wind turbine generators of the wind power facility;
   after preloading the second set of operational parameters, continuing to operate the plurality of wind turbine generators according to the first set of operational parameters, until a transition triggering signal is received, wherein the transition triggering signal does not include operational set points for the plurality of wind turbine generators; and
   in response to receiving a transition triggering signal at the plurality of wind turbine generators, operating the plurality of wind turbine generators according to the second set of operational parameters.

2. The method of claim 1, wherein the second set of operational parameters indicate different operational parameters for at least one wind turbine generator of the plurality of wind turbine generators relative to operational parameters for remaining wind turbine generators of the plurality of wind turbine generators.

3. The method of claim 1, wherein the second set of operational parameters include a ramping rate from the first set of operational parameters to maintain at least one of a voltage or a frequency in the power grid as the wind power plant transitions to the island mode of operation.

4. A wind turbine power facility comprising:
   a plurality of wind turbine generators; and
   a wind power facility controller configured to:
      operate the plurality of wind turbine generators according to a first set of operational parameters for a normal mode of operation to provide power to an external power grid connected to the wind turbine power facility;
      preload, while operating the plurality of wind turbine generators according to the first set of operational parameters, the plurality of wind turbine generators with a second set of operational parameters, different than the first set of operational parameters, for an island mode of operation to provide power to the wind turbine power facility when the wind turbine power facility is disconnected from the external power grid;
      continue to operate the plurality of wind turbine generators according to the first set of operational parameters after preloading the second set of operational parameters;
      transmit a triggering signal to the plurality of wind turbine generators, wherein the triggering signal does not include operational set points for the plurality of wind turbine generators; and
      operate, after transmitting the triggering signal, the plurality of wind turbine generators according to the second set of operational parameters.

5. The wind turbine power facility of claim 4, wherein the second set of operational parameters indicate different operational parameters for at least one wind turbine generator of the plurality of wind turbine generators relative to operational parameters for remaining wind turbine generators of the plurality of wind turbine generators.

6. The wind turbine power facility of claim 4, wherein the second set of operational parameters include a ramping rate from the first set of operational parameters to maintain at least one of a voltage or a frequency in the power grid as the wind power plant transitions to the island mode of operation.

7. The wind turbine power facility of claim 4, wherein the wind power facility controller configured to:
 preload, while operating the plurality of wind turbine generators according to the second set of operational parameters, the plurality of wind turbine generators with the first set of operational parameters for the normal mode of operation to provide power to the external power grid when connected to the wind turbine power facility;
 continue to operate the plurality of wind turbine generators according to the second set of operational parameters after preloading the first set of operational parameters;
 transmit a second triggering signal to the plurality of wind turbine generators, wherein the second triggering signal does not include operational set points for the plurality of wind turbine generators; and
 operate, after transmitting the second triggering signal, the plurality of wind turbine generators according to the first set of operational parameters.

8. A method for controlling a wind power facility comprising a plurality of wind turbine generators to transition to a normal mode of operation from an island mode of operation, the method comprising:
 operating the plurality of wind turbine generators according to a first set of operational parameters for the island mode of operation to provide power to the wind power facility when disconnected from an external power grid;
 while operating the plurality of wind turbine generators according to the first set of operational parameters, preloading the plurality of wind turbine generators with a second set of operational parameters, different than the first set of operational parameters, for the normal mode of operation to provide power the external power grid as the wind power facility connects to the external power grid;
 after preloading the second set of operational parameters, continuing to operate the plurality of wind turbine generators according to the first set of operational parameters, until a transition triggering signal is received, wherein the transition triggering signal does not include operational set points for the plurality of wind turbine generators; and
 in response to receiving the transition triggering signal at the plurality of wind turbine generators, operating the plurality of wind turbine generators according to the second set of operational parameters.

9. The method of claim 8, wherein the second set of operational parameters indicate different operational parameters for at least one wind turbine generator of the plurality of wind turbine generators relative to operational parameters for remaining wind turbine generators of the plurality of wind turbine generators.

10. The method of claim 8, wherein the second set of operational parameters include a ramping rate from the first set of operational parameters to maintain at least one of a voltage or a frequency in the power grid as the wind power plant transitions to the normal mode of operation.

* * * * *